United States Patent [19]

Schimko

[11] 4,385,508
[45] May 31, 1983

[54] GUARD FOR THE ZONE OF MOVEMENT OF THE CARRIAGE OF A FLATBED KNITTING MACHINE

[75] Inventor: Reinhold Schimko, Aalen-Wasseralfingen, Fed. Rep. of Germany

[73] Assignee: Universal Maschinenfabrik Dr. Schieber GmbH, Westhausen, Fed. Rep. of Germany

[21] Appl. No.: 190,776

[22] Filed: Sep. 25, 1980

[30] Foreign Application Priority Data

Oct. 1, 1979 [DE] Fed. Rep. of Germany ....... 2939833

[51] Int. Cl.³ .............................................. D04B 35/10
[52] U.S. Cl. ..................................... 66/157; 66/60 R; 66/64; 378/209
[58] Field of Search ........................ 83/DIG. 1, 68, 65; 66/64, 60, 157; 112/261; 250/277

[56] References Cited

U.S. PATENT DOCUMENTS

| | | | |
|---|---|---|---|
| 3,474,252 | 10/1969 | Jacobsen | 250/221 X |
| 3,704,396 | 11/1972 | MacDonald | 250/221 X |
| 3,805,061 | 4/1974 | Demissimy et al. | 250/221 X |
| 3,842,260 | 10/1974 | Christensen et al. | 250/221 |
| 3,851,168 | 11/1974 | Erbstein | 250/221 |
| 3,912,924 | 10/1975 | Barrett | 250/221 |
| 3,944,818 | 3/1976 | Bechtel | 250/221 |
| 4,015,122 | 3/1977 | Rubinstein | 250/221 |
| 4,104,518 | 8/1978 | Schachinger et al. | 250/221 |
| 4,266,124 | 5/1981 | Weber et al. | 250/221 |

Primary Examiner—Ronald Feldbaum
Attorney, Agent, or Firm—Sughrue, Mion, Zinn, Macpeak and Seas

[57] ABSTRACT

The zone of movement of the reciprocating carriage of a flatbed knitting machine is guarded, to prevent injury to the operator, by a light barrier set up between each end of the machine and the carriage. Only the barrier on that side of the carriage towards which the carriage is moving at any given time is effective to trigger braking of the carriage and stopping of the machine if the barrier is penetrated. The carriage may carry a double-sided reflector with combined light emitter/receiver units positioned at each end of the machine.

3 Claims, 3 Drawing Figures

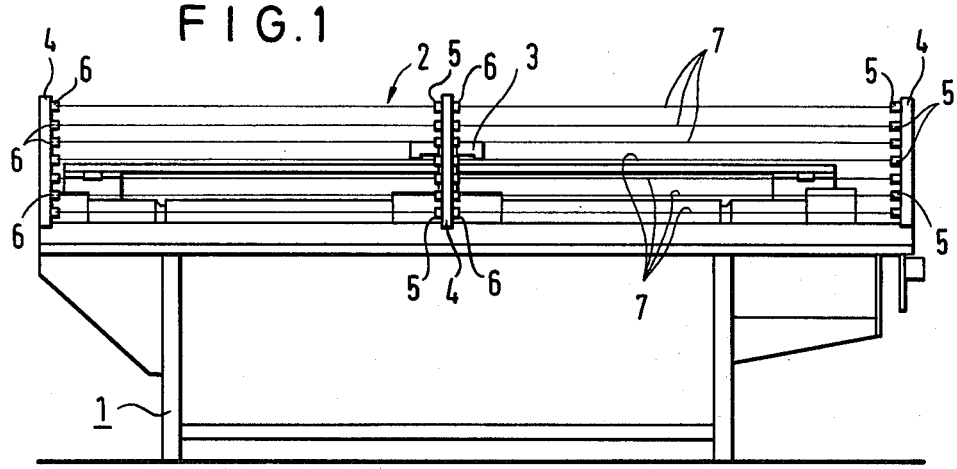
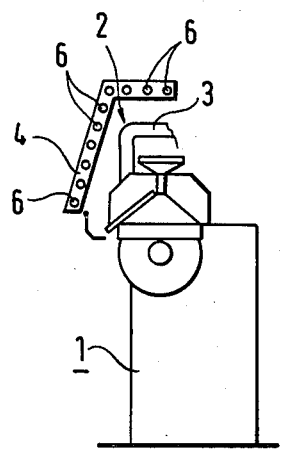
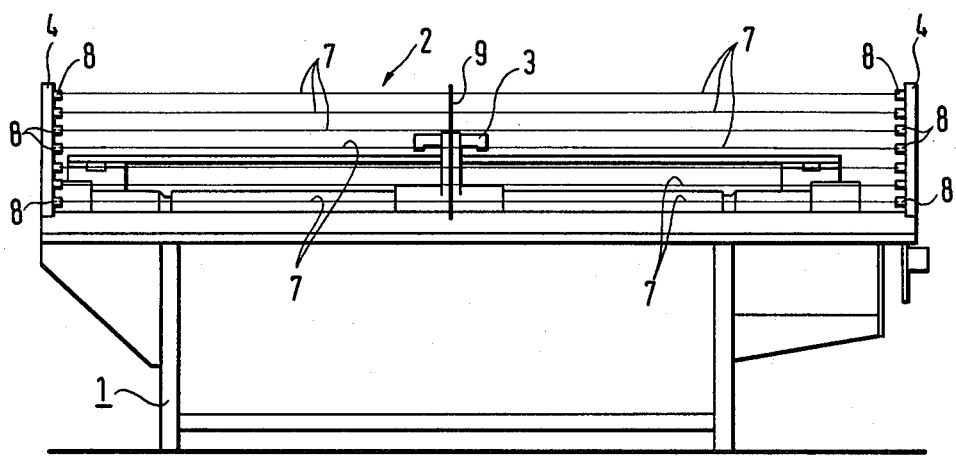

GUARD FOR THE ZONE OF MOVEMENT OF THE CARRIAGE OF A FLATBED KNITTING MACHINE

FIELD OF THE INVENTION

This invention relates to a guard for the zone of movement of the reciprocating carriage of a flatbed knitting machine, the guard comprising a light barrier extending parallel to the direction of movement of the carriage and disconnection means for bringing the machine to a standstill in the event that the light barrier is broken.

In flatbed knitting machines having carriages which move back and forth there is a very great danger of injury being caused to the operating personnel using the machine due to the carriage. The reciprocating carriage of the flatbed knitting machine slides very closely over the needle bed and is brought up short at both sides of the machine against opposed stops in order to trigger various functions. This constitutes a source of danger in the form of crushing injuries. Also, the small spacing of the cams on the carriage from the needle bed, from which the feet of needles, jacks and pushers project, as well as the thread guide pick-ups which slide closely over the thread guide rails, can also constitute sources of harmful crushing injuries, so that the person operating the flatbed knitting machine is open to very considerable danger.

DESCRIPTION OF THE PRIOR ART

Protection devices for the zone of movement of the reciprocating carriages of flatbed knitting machines are known which consist of protective screens or full covers. These guards have the disadvantage that they both severely restrict the view of the knitting process, or at least make this partially impossible, and also severely restrict the feeding of the threads and the operation of the machine.

Flatbed knitting machines are also known where the working chamber is protected by light barriers so that upon interruption of the light barrier the machine is brought to a standstill. However, these constitute an obstruction to working and to the machine operator.

SUMMARY OF THE INVENTION

It is an object of the present invention to provide a guard of the type first referred to above which, without hindering viewing, working or the operator, provides a reliable protection against crushing and injury due to the moving carriage of the flatbed knitting machine.

This is achieved in accordance with the present invention by a guard for the zone of movement of the reciprocating carriage of a flatbed knitting machine, comprising a light barrier extending parallel to the direction of movement of the carriage, and disconnection means for bringing the machine to a standstill upon interruption of the light barrier, characterised in that separate light barriers are provided between each end face of the flatbed knitting machine and the carriage and in that only the light barrier on the side of the carriage towards which the carriage is moving at any given time is effective to trigger said disconnection means.

Consequently, in the event of a careless movement into the danger zone towards which the carriage of the machine is moving, the machine is immediately brought to a stop and the carriage is braked in its movement so that the danger of injury to the operator is avoided. Manual attention to those parts of the flatbed knitting machine in the zone away from which the carriage is moving is thus still possible without bringing the machine to a stop.

Preferably, light emitters and light receivers are provided as combined units arranged on the end faces of the flatbed knitting machine and the carriage carries a double-sided reflector. The light beams emitted by the light emitters are reflected by the reflector to the light receivers on the same end face of the flatbed knitting machine. Consequently, the carriage itself carries no active part of the optical shield.

BRIEF DESCRIPTION OF THE DRAWING

In order that the invention may be fully understood two embodiments of guard in accordance with the invention will now be described in detail by way of example and with reference to the drawing. In the drawing:

FIG. 1 is a schematic front view of a flatbed knitting machine equipped with a first embodiment of guard in accordance with the invention;

FIG. 2 is a side view of the flatbed knitting machine of FIG. 1; and,

FIG. 3 is a schematic front view of a flatbed knitting machine fitted with a second embodiment of guard in accordance with the invention.

DESCRIPTION OF THE PREFERRED EMBODIMENTS

In the embodiment of guard shown in FIGS. 1 and 2, three hoops 4 are fitted to the machine, one at each end of the flatbed knitting machine 1 outside the movement zone 2 of the carriage 3, and a third on the carriage 3 itself. On the right-hand hoop 4, as viewed in the drawing, and on the right-hand side of the hoop which is on the carriage there are fitted light emitters 5 in the form of photoelectric elements, and on the left-hand hoop 4 and on the left-hand side of the hoop which is on the carriage there are fitted light receivers 6 which are also formed as photoelectric elements. Thus, a light barrier 7, i.e. a light beam, is formed between each one of the light emitters 5 and a light receiver 6. The movement zone 2 of the carriage 3 of the flatbed knitting machine is protected by these light beams 7 against penetration of the barrier.

The light emitters and receivers 5 and 6 are connected to an electrical circuit which is not shown in detail and which serves to bring the machine to a stop and to brake the movement of the carriage 3 in the event that there is an interruption of at least one of those light beams 7 towards which the carriage 3 is moving.

The guard works as follows. When the flatbed knitting machine 1 is switched on, the light emitters 5 on the one end face of the flatbed knitting machine 1 and on one side of the hoop 4 on the carriage 3 and the light receivers 6 on the other end face of the flatbed knitting machine 1 and on the other side of the hoop 4 on the carriage 3, of which the same numbers of each are provided, are activated in the electrical circuit for stopping the machine and braking the carriage 3 on the side to which the carriage 3 is to move. If any one of those light beams 7 between one of the light emitters and receivers 5, 6 on that side of the carriage is broken, then a switching process is triggered which brings the flatbed knitting machine to a standstill and actuates a brake so that the carriage 3 is brought to a stop in the shortest possible distance. Since the light emitters and receivers 5 and 6 are so arranged that the whole zone of movement 2 of the carriage 3 is shielded by light beams 7 against penetration by the operator, injury to the operator by the moving carriage 3 is reliably avoided.

FIG. 3 shows a second embodiment of guard in accordance with the invention fitted on a flatbed knitting machine 1. This embodiment differs from the embodiment shown in FIG. 1 in that units 8 which each constitute both a light emitter and a light receiver are fitted on the hoops 4 at both ends of the flatbed knitting machine. A reflector 9 is provided on the movable carriage 3 and this reflects light beams towards both ends of the flatbed knitting machine 1. Thus, the light beams 7 provided to shield the movement zone 2 of the carriage 3 are formed between each one of the units 8 and the reflector 9, since the light beams emitted by each unit 8 are returned by the reflector 9 towards the unit 8 at the same end of the flatbed knitting machine. The units 8 are connected into the electrical circuit for stopping the flatbed knitting machine and braking the carriage 3 in such a way that the stopping and braking mechanism can only be actuated if a light beam 7 is broken in that part of the movement zone 2 of the carriage 3 towards which the carriage 3 is moving. Also, it is always the case that only those units 8 which are on the side towards which the carriage 3 is moving are effective, while those units 8 on the other side, away from which the carriage is travelling, are bypassed. The machine only switches off if a light beam 7 is broken between the carriage 3 and that end of the machine towards which the carriage 3 is moving; the interruption of a light beam 7 between the carriage 3 and that end of the machine away from which the carriage 3 is moving does not result in the machine being switched off. As a consequence, it is possible for the operator to reach into the latter part of the movement zone of the carriage 3 without the machine being switched off and without there being any danger of injury to the operator. Moreover, with this arrangement, a view of the knitting process is always possible over the full movement zone of the carriage 3. The feeding of the threads and the operation of the machine is not hindered by the protective cage which is formed by the light barrier.

It is pointed out that references in the foregoing description and in the appended claims to light beams and barriers is not intended to limit the invention to the use of light in the visible part of the electromagnetic spectrum.

I claim:

1. A guard for the zone of movement of the reciprocating carriage of a flatbed knitting machine comprising a light barrier extending parallel to the direction of movement of the carriage and disconnection means for bringing the machine to a standstill upon interruption of the light barrier, said light barrier comprising first light barrier forming means mounted at each end of said flatbed knitting machine and second light barrier forming means mounted on said carriage for movement therewith to form first and second light barrier portions between each of said first barrier forming means and said second barrier forming means respectively and said disconnection means being responsive to only one of said light barrier portions at a time on the side of said carriage in the direction of movement of said carriage.

2. A guard as set forth in claim 1 wherein each of said first light barrier forming means at each end of said machine is comprised of one of a pair of elements including a light emitter and a light receiver and said second light barrier forming means is comprised of two elements each of which is complementary to each of said first light barrier forming means.

3. A guard as set forth in claim 1 wherein each of said first light barrier forming means is comprised of a combination light emitter and light receiver and second light barrier forming means is comprised of a double-sided reflector.

* * * * *